July 3, 1962  W. A. LLOYD ET AL  3,042,824
IMPROVED VACUUM PUMPS
Filed June 22, 1960  2 Sheets-Sheet 1

Inventors
William A. Lloyd
Renn Zaphiropoulos
BY Harry E. Aine
ATTORNEY

July 3, 1962 W. A. LLOYD ET AL 3,042,824
IMPROVED VACUUM PUMPS
Filed June 22, 1960 2 Sheets-Sheet 2
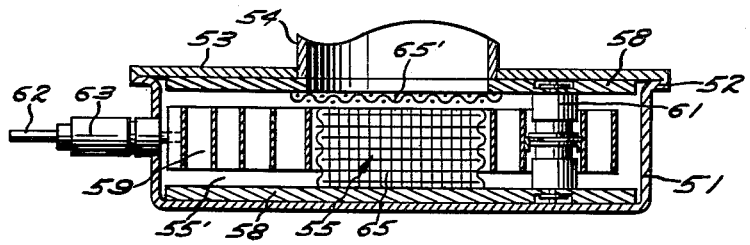
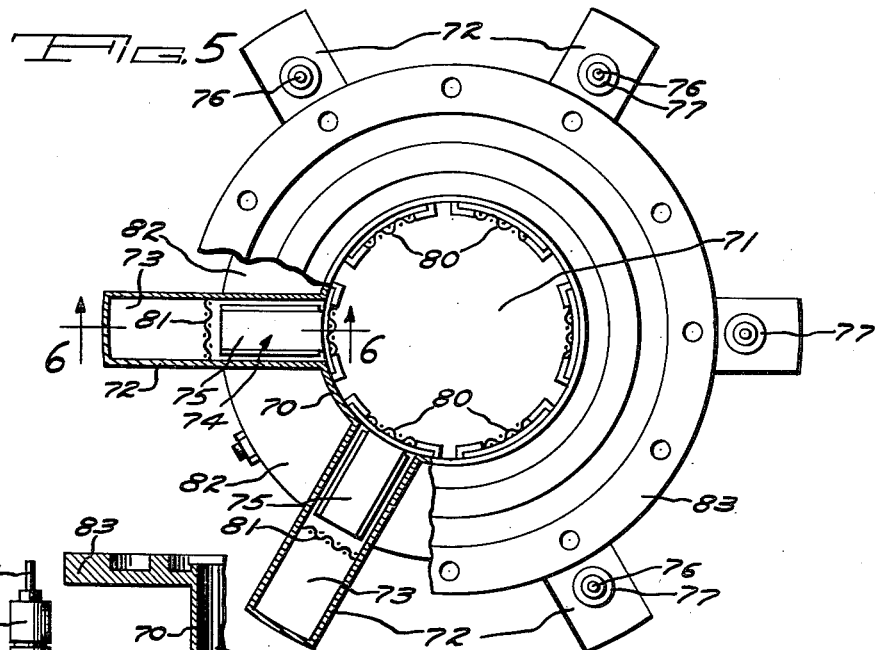
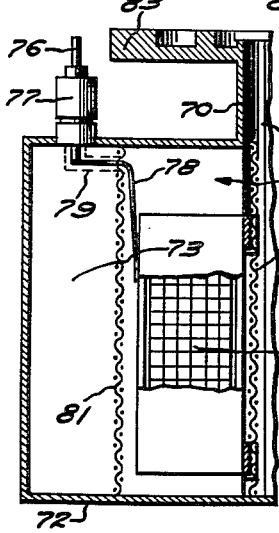
Inventors
William A. Lloyd
Renn Zaphiropoulos
BY Harry E. Aine
ATTORNEY ical Office 3,042,824
Patented July 3, 1962

3,042,824
IMPROVED VACUUM PUMPS
William A. Lloyd, Sunnyvale, and Renn Zaphiropoulos,
Los Altos, Calif., assignors to Varian Associates, Palo
Alto, Calif., a corporation of California
Filed June 22, 1960, Ser. No. 38,028
14 Claims. (Cl. 313—7)

The present invention relates in general to getter ion vacuum pump apparatus and, more specifically, to a novel getter ion vacuum pump configuration in which the starting of the pumping action has been greatly facilitated by means of confining the discharge within the anode-cathode area of the pump. Such a vacuum pump is extremely useful for providing uncontaminated high vacuum as required in many devices.

Heretofore, it has been observed that when high voltage is supplied to a getter ion vacuum pump, a gas discharge is generated which may fill the complete container of the pump including the gas access passageways and in certain cases, penetrate through the entire vacuum system. At the same time, the discharge concentration within the actual gas-pumping anode-cathode region becomes very low, which can result in very ineffective pumping. It is also known that such a discharge has a cleaning effect on the inside walls of a vacuum envelope which will cause the gas pressure in the system to rise. Therefore, the combination of first having a gas discharge throughout the vacuum system and second having a low density discharge in the anode-cathode region causes difficulty in starting the vacuum pump.

It is, therefore, the object of the present invention to provide a novel method and means for confining the gas discharge within the pump to the anode-cathode region in order to facilitate starting of the pump and permit the pumps to handle larger amounts of gas.

The main feature of the present invention is the confining of the gas discharge to the anode-cathode region of the pump by a gas permeable shield isolating the anode-cathode region from the remaining regions of the pump including the gas access passageways.

Another feature of the present invention is the shielding of the high voltage lead areas so that the gas discharge will be further confined.

Figure 1:
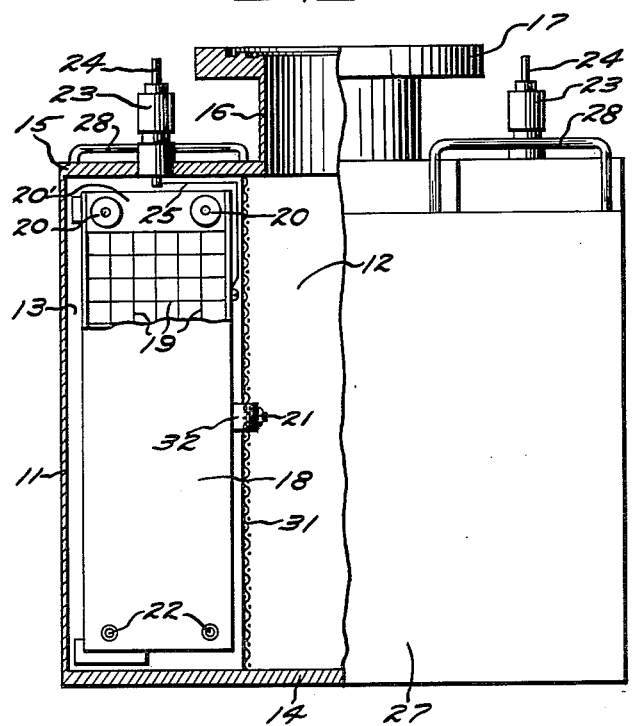
Figure 3:
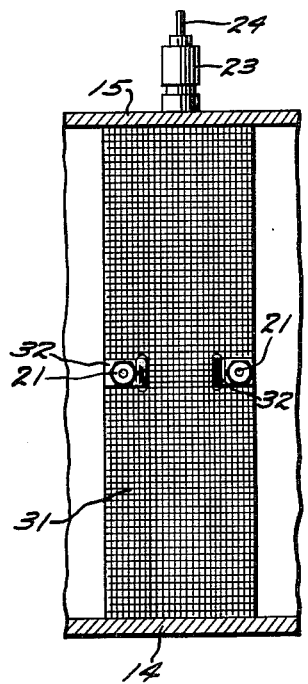
Figure 2:
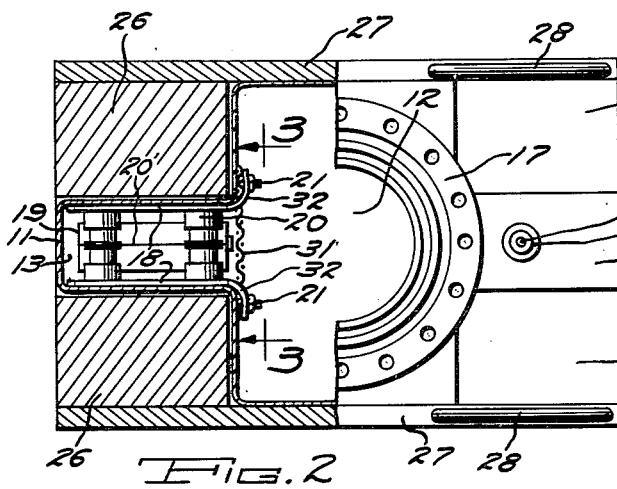
Figure 4:
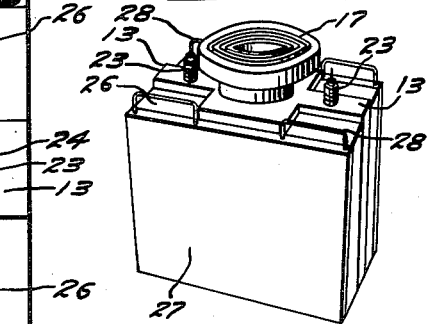

Other and further features of the present invention will become apparent upon perusal of the following specification taken in connection with the accompanying drawings, wherein:

FIG. 1 is a plane view partially cut away showing one embodiment of the present invention, FIG. 2 is a top view partially cut away of the pump shown in FIG. 1, FIG. 3 is a cut away view of a portion of the structure of FIG. 2 taken along line 3—3 in the direction of the arrows, FIG. 4 is a perspective view showing the novel vacuum pump of the present invention, FIG. 5 is a top view partially cut away showing another embodiment of the present invention, FIG. 6 is a partial cross section of FIG. 5 taken at line 6—6 in the direction of the arrows, and FIG. 7 is a plan view partially cut away showing another embodiment of the present invention.

Referring now to the drawings of FIGS. 1-4, there is shown a novel getter ion vacuum pump apparatus of the present invention. More specifically, a vacuum tight envelope 11 as of, for example, stainless steel, is provided with a central rectangular-shaped chamber 12 having a pair of lesser rectangular chambers 13 communicating therewith through longitudinal openings in the side walls of the central rectangular chamber 12. The ends of envelope 11 are closed off by end walls 14 and 15 suitably sealed to the side walls of the envelope 11 by, for example, heliarc welding.

A cylindrical adaptor tubing 16 as of, for example, stainless steel, is carried from the apertured end wall 15 and communicates with the central chamber 12. An annular flange 17 as of, for example, stainless steel is carried from the end of the adaptor tubing 16 in a vacuum tight manner and is adapted for communication with any structure it is desired to evacuate.

The pumping elements of the present invention are carried within the two lesser rectangular chambers 13. The pumping elements each include cathode plates 18, anode member 19 and cathode spacers 20, the cathode plates 18 and anode 19, made of a reactive material as of, for example, titanium, being fixedly secured within the lesser rectangular chambers 13 by means of cathode spacers 20. The spacers 20 are ceramic insulators also serving to insulate the anode from the cathode and to preserve the correct spacing between the cathode plates and cellular anode 19.

The entire pumping units are secured by means of bolts 21, which pass through apertures in cathodes 18 and through hollow cathode spacers 20 and secured thereto by nuts or any other desired means (not shown).

High voltage is supplied to anode 19 through an aperture in the top of lesser rectangular chamber 13 which is provided to accommodate a ceramic insulator 23 which carries high voltage lead 24 into the pumping elements via lead 25 secured to anode 19 in any desired manner.

A magnetic field of 1,000 to 1,800 gausses is applied perpendicular to the cathode plates 18 via a plurality of rectangular permanent magnets 26 as of, for example, nickel, aluminum and steel. The permanent magnets 26 are fixedly secured to rectangular pole pieces 27, which are fixedly secured to pump envelope 11 by any desired means. A pair of handles 28 fixedly secured to pole piece 27 are provided for easy handling of the pump.

Securely attached across the entrance into each of the two lesser rectangular chambers 13 from central chamber 12 are shields 31, which may be any gas permeable metal screen, mesh, louver, or any other gas permeable conductor, which are grounded to cathodes 18 by means of element clamps 32. Shield 31 completely covers the entrance of main chamber 12 into lesser chambers 13 but allows free access to gas particles therebetween.

Cathode plates 18 are electrically insulated from anodes 19 via the ceramic insulators 20 and insulator support 20' and are electrically connected, via element clamp 32, to shield 31 and to the grounded pump envelope 11.

In operation, the apparatus is evacuated to a pressure of approximately $10^{-2}$ millimeters of mercury via, for example, a mechanical pump (not shown). A positive potential as of, for example, 3,000 volts is applied to the anodes with respect to the cathode plates, and envelope for initiating a glow discharge therebetween while the magnetic field is applied by the permanent magnets of between 1,000 and 1,800 gausses.

The resulting ionization and bombardment of the negative cathode plates by the positive ions is well known in the getter ion vacuum pump art and will only be described briefly as follows: Electrons, tending to flow to the anode due to the electric field formed between the anode and cathode, are forced into a spiral path by the presence of the strong magnetic field. The greatly increased electron path length results in a high probability of collision between free electrons and gas molecules. These collisions produce gas ions and more free electrons, these free electrons in turn colliding with other gas molecules to free ions and electrons. The positively charged gas ions then bombard the titanium cathode plates from which titanium atoms are knocked out (sputtered). The sputtered titanium atoms are deposited on the anode grid and other tube elements, forming chemically stable compounds with the active gas atoms such as oxygen and nitrogen. Chemically inert gases are also removed by ion burial in the cathode and by entrapment on the anode.

In the present invention, the gas permeable shield 31 acts to confine the electric field to the anode-cathode area of the pump, the shielding being accomplished through grounding of the gas permeable screen electrically to the cathode plates and pump envelope. In this manner the negatively charged electrons will be repelled by the negatively ground shield while the positive ions will be grounded out by the shield. However, gas molecules will pass freely through the shield into the anode-cathode region. The cleaning effect will therefore be restricted to a relatively small area of the entire pumping system thereby facilitating starting of the pumping and permitting the pump to handle larger loads of gas. With the electric field now confined to the pumping element area, a high density electric field will occur in the anode-cathode to greater facilitate easy starting of the pump.

Referring now to the FIG. 5, there is shown an alternative embodiment of the present invention wherein the envelope 70 comprises a hollow cylindrical first gas access chamber 71 with a plurality of rectangular lesser chambers 72 extending radially outward therefrom like the spokes of a wheel. As best seen in FIG. 6, each lesser chamber 72 constitutes a second gas access chamber 73 in the radial outward portion thereof and a pumping chamber 74 in the portion adjacent the first gas access chamber 71. A pumping element 75 similar to the pumping element described in FIGS. 1–4 comprising anode and cathode members is longtudinally positioned in the pumping chamber 74 within each of the lesser chambers 72 along the opening between the first gas access chamber 71 and second gas access chamber 73 by means of rectangular guide tabs (not shown). A flange 83 is carried from the upper end of envelope 70 for air tight mating with the structure it is desired to evacuate.

The second gas access chamber 73 is made of such a size that the sum of the volume of all the second gas access chambers 73 is approximately the same as the volume of the first gas access chamber 71.

High voltage is supplied to the pumping element 74 through an aperture in lesser chamber 72 which is provided to accommodate ceramic insulator 77 which carries a high voltage lead 76 to the pumping element 75 via lead 78. A high voltage shield 79 is provided around lead 78 to prevent discharge from occurring in gas access chamber 73 from lead 78.

A magnetic field is provided by a plurality of permanent magnets 82 positioned on either side of the pumping element 75 by any deisred means.

Positioned across the opening into each lesser chamber 72 is a gas permeable shield 80 which completely covers the entrance of the main chamber 71 into the lesser chambers 72 but allows free access to gas particles therebetween. Further, another gas permeable shield 81 similar to shield 80 is provided between second gas access chamber 73 and the pumping elements 75.

This embodiment operates in essentially the same manner as described for the embodiments of FIGS. 1–4, the shield screens 80 and 81 serving to confine the glow discharge within the pumping chamber 74.

Still another embodiment of the present invention is shown in FIG. 7. More specifically, a circular shallow cup-shaped envelope 51 having an outwardly flanged lip 52 is provided with a centrally apertured top plate 53.

A cylindrical adaptor tubing 54 is carried from the apertured top plate 53 and communicates with a central chamber 55 within the circular envelope 51 by way of the circular opening in top plate 53. Cylindrical adaptor tubing 53 has affixed thereto suitable means for mating in an air tight manner with the structure it is desired to evacuate.

Extending radially from central chamber 55 is a lesser chamber 55' containing the anode and cathode members of the present embodiment. Cathode plates 58 are secured to the bottom and top portion of envelope 51 by means of ceramic insulators 61. It is noted that the cathode plate affixed to top plate 53 is centrally apertured to permit communication between central chamber 55 and cylindrical adaptor tubing 54.

Positioned between the cathode plates 53 are rectangular cellular anodes 59 carried within the envelope 51 in the over-all form of an annular shaped honeycomb composed of rectangular cellular anodes. The ceramic insulators 61 which extend transversely of the cathode plates 58 also fixedly hold the anode 59 at the proper spacing with respect to the cathode plates 58. High voltage is applied to the anode 59 by means of high voltage lead 62 which passes through an aperture in the side of envelope 51 and is insulated therefrom by means of ceramic insulators 63.

Securely attached across the entrance from the central chamber 55 to the radially extending lesser chamber 55' housing the pumping elements of the present embodiment is a gas permeable cylindrical shield 65 which completely covers the entrance of the main chamber 55 and the lesser radially extending chamber 55'. As an alternative, a gas permeable shield 65' may be fixedly secured across the aperture of top plate 53 to completely cover the entrance of the main gas chamber 55 and adaptor housing 54 but allow free gas access to gas particles therebetween.

This embodiment also operates similarly to the above described embodiments, the shield 65 or alternative shield 65' serving to confine the glow discharge to the actual cathode-anode gas pumping region of the vacuum pump system.

It is noted that the size, shape, location and type of shield shown in the above embodiments are merely shown as illustrative and in no way meant to be limiting. For example, a single cylindrical shield could have been used in place of shields 80 in FIG. 5 or a shield might be positioned across opening into adaptor tubing 16 of FIGS. 1–4.

Further, if a getter ion vacuum pump were utilized within the structure it is desired to evacuate, a shield of the type shown and described above may completely surround the pumping element to confine the gas discharge to the cathode-anode area.

The above embodiments thus clearly illustrate a novel improved method of and apparatus for facilitating the starting and the subsequent pumping action of a getter ion vacuum pump.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A getter ion vacuum pump apparatus having an anode-cathode area including a cathode of reactive material and an anode, means for establishing an electrical field between said cathode and anode, a magnetic field means adapted to produce a magnetic field through said cathode and anode whereby a glow discharge is produced in said anode-cathode area resulting in the sputtering of getter material from said cathode, said pump having a gas access area communicating with said anode-cathode area, and a gas permeable means between the anode-cathode area and the gas access area and means for applying an electrical potential thereon for confining the electric field within said anode-cathode area to thereby confine the glow discharge within said anode-cathode area and preventing it from occurring in said gas access area.

2. A getter ion vacuum pump apparatus as claimed in claim 1 wherein said gas permeable means comprises a shield directly electrically coupled to said cathode.

3. An electrical vacuum pump apparatus utilizing the principle of cathode disintegration by particle bombardment including, an anode structure having a plurality of glow discharge passageways, said glow discharge passageways being grouped transversely to the longitudinal axes of said passageways, a reactive cathode structure for disintegration by particle bombardment, said anode structure and cathode structure defining an anode-cathode area, means for applying a potential difference between said anode and cathode structures of sufficient magnitude to produce a simultaneous glow discharge within said glow discharge passageways and to bombard said cathode structure with positive ion particles of sufficient velocity to sputter portions of said cathode structure onto adjacent structure to getter gas coming in contact therewith, means for producing and directing a magnetic field coaxially of and within said glow discharge passageways for enhancing the glow discharge and thus the pumping speed of the pump, said pump having a gas access area communicating with said anode-cathode area, and gas permeable means for electrically isolating said anode-cathode area from said gas access area to thereby confine the glow discharge to said anode-cathode area.

4. An electrical vacuum pump apparatus as claimed in claim 3 wherein said gas permeable means comprises an electrode having openings therein bearing an electrical potential and serving to confine the electric field between said anode and cathode to said anode-cathode area.

5. A getter ion vacuum pump apparatus including, an envelope containing a central chamber and a plurality of outwardly extending chambers communicating with said central chamber, anode and cathode members disposed within outwardly extending chambers, said anode and cathode members adapted, when located in a magnetic field and when energized to provide an electric field therebetween, to produce a glow discharge therebetween for pumping gaseous matter within said envelope, and gas permeable means between said central chamber and said outwardly extending chambers for electrically isolating said chambers to thereby confine the glow discharge to the anode-cathode region.

6. The apparatus according to claim 5 including magnetic means disposed around said outwardly extending chambers for providing said magnetic field within said outwardly extending chambers to enhance the pumping speed of the pump.

7. The apparatus according to claim 5 wherein said gas permeable means is a conductive shield electrically connected to said cathode members.

8. A sputter ion vacuum pump apparatus including, an envelope containing a central hollow chamber arranged for communicating with the structure it is desired to evacuate, a plurality of lesser chambers communicating with said central chamber, said lesser chambers extending outward of said central chamber and extending lengthwise of said central chamber, each of said lesser chambers including an anode structure having a plurality of glow discharge passageways, said glow discharge passageways being grouped transversely to the longitudinal axes of said passageways, and a reactive cathode structure for disintegration by particle bombardment, said anode and cathode structure adapted, when located in a magnetic field extending through said cathode and anode structures and when energized to provide an electric field therebetween, to produce a plurality of glow discharges therebetween resulting in the removal of gaseous matter within said envelope, and a gas permeable means disposed between said central hollow chamber and said lesser chambers to electrically isolate said central chamber from said lesser chambers to confine the glow discharge to the lesser chamber areas of the pump by electrically shielding said central hollow chamber from said lesser chambers.

9. A sputter ion vacuum pump apparatus as claimed in claim 8 wherein said gas permeable means is a conductive shield electrically connected to said cathode structure, said gas permeable means is further dispsoed between central hollow chamber and the structure it is desired to evacuate.

10. A sputter ion vacuum pump apparatus as claimed in claim 8 including magnetic means disposed around said lesser chambers for providing said magnetic field through said cathode and anode structures.

11. Apparatus for pumping gases from within an evacuable structure comprising, an anode electrode and a mutually opposed spaced-apart cathode electrode, an anode-cathode area defined by the region between said mutually opposed anode and cathode electrodes, means for establishing a glow discharge between said anode and cathode electrodes, said anode electrode being subdivided into a plurality of lesser open-ended compartments formed by holes extending through said anode, means for producing and directing a magnetic field threading through said hollow compartments extending through said anode member, and a gas permeable means for electrically isolating said anode-cathode area to confine the glow discharge between said anode and cathode electrodes.

12. The apparatus according to claim 11 wherein said gas permeable member includes a metallic screen at substantially the same electrical potential as said cathode.

13. The method for pumping gases from within an evacuable structure comprising the steps of, establishing a glow discharge in an anode-cathode area, an anode and a spaced-apart reactive cathode member disposed within the structure, the region between said anode and said cathode defining said anode-cathode area, bombarding the reactive cathode member with high speed positive ions produced by the glow discharge to produce sputtering of the reactive cathode material upon portions of the surfaces within the structure for gettering gas coming in contact therewith, establishing a voltage shield around said anode-cathode area to confine the glow discharge and sputtering to the anode-cathode area to enhance pumping of the structure.

14. The method of pumping gases according to claim 13 wherein said voltage shield is substantially at the same electrical potential as said cathode member.

References Cited in the file of this patent

UNITED STATES PATENTS

| | | |
|---|---|---|
| 2,727,167 | Alpert | Dec. 13, 1955 |
| 2,925,504 | Cloud et al. | Feb. 16, 1960 |